Oct. 14, 1941.  C. E. BROWN  2,258,969
SAW VISE
Filed July 26, 1939
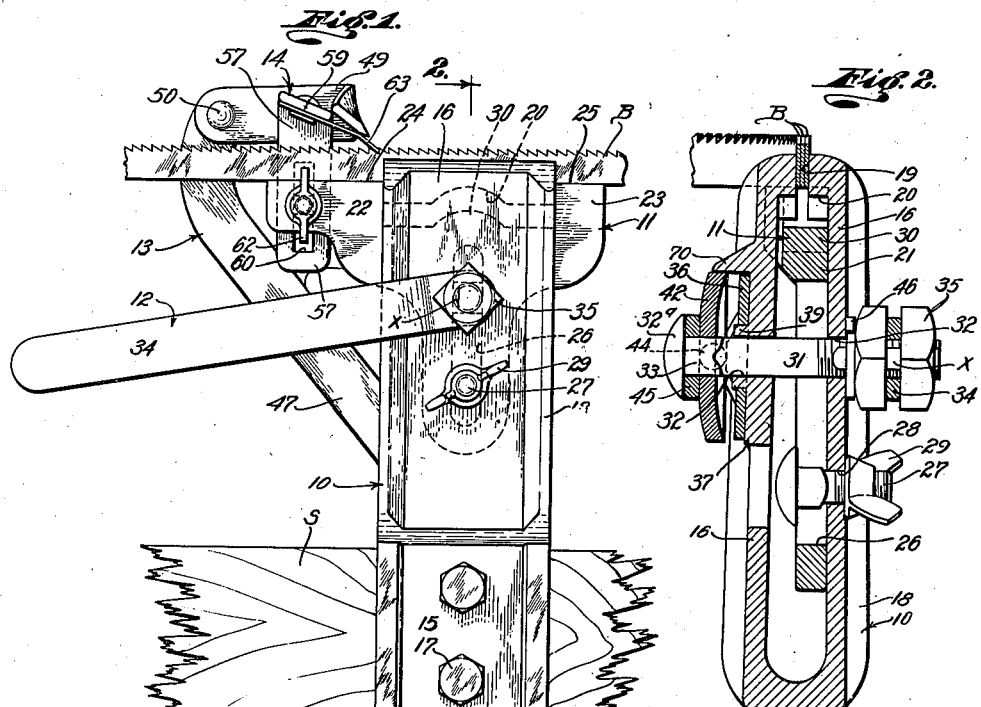
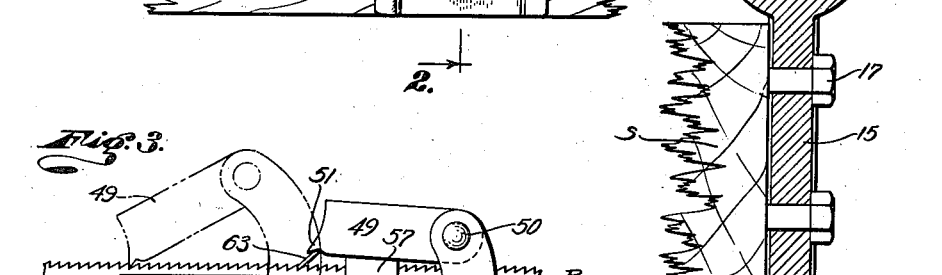
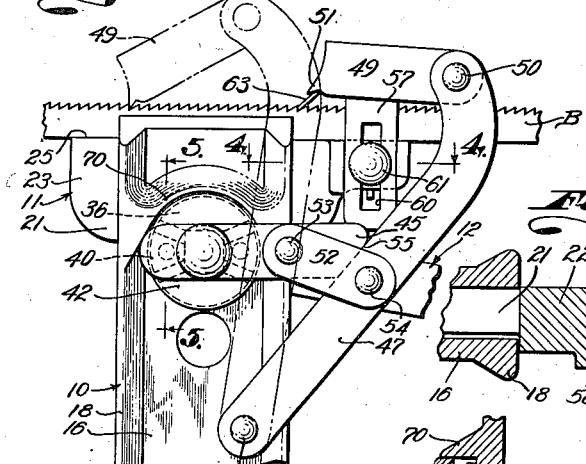
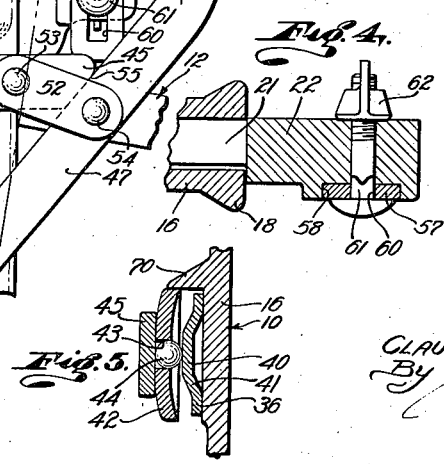
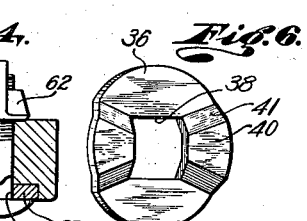
Inventor
CLAUDE E. BROWN
By
His Attorney Patented Oct. 14, 1941

2,258,969

UNITED STATES PATENT OFFICE 2,258,969

SAW VISE

Claude E. Brown, Santa Ana, Calif.

Application July 26, 1939, Serial No. 286,580

3 Claims. (Cl. 76—77)

This invention relates to clamps and holding devices and relates more particularly to a saw vise useful in filing or sharpening saws. A general object of this invention is to provide a simple, practical and improved saw holder or saw vise.

Another object of this invention is to provide a saw vise useful in sharpening band saws and the like, that operates to automatically advance the saw when the jaws are opened so that the sharpened portion of the saw is fed from the vise and an unsharpened portion is moved to a position between the vise jaws to be gripped when the jaws are reclosed.

Another object of this invention is to provide a saw holder or vise that is adapted to hold a band saw which has been looped to have a plurality of convolutions or loops and that effectively grips the several loops so that the teeth on several portions of the loops may be simultaneously filed and then is operable to simultaneously advance the loops in such a manner that the teeth on the next portions of the blade loops are automatically aligned or brought into register for simultaneous sharpening. This action of the device greatly accelerates the sharpening of the blade as several parts of the blade are automatically conditioned for simultaneous sharpening at each operation.

Another object of this invention is to provide a saw vise of the character mentioned in which a simple, swinging movement of a manual handle or lever serves to open the jaws and to advance the saw blade or blade loops, and a similar return movement of the lever operates to restore the saw advancing means and to tightly close the jaws on the saw blade or blade loop portions.

Another object of the invention is to provide a saw holder of the character mentioned that embodies a simple yet very effective means for bringing the teeth of saw blade loops into register for simultaneous filing and for holding the loop portions in correct position for filing, said means operating automatically when the jaws are opened and closed.

Another object of this invention is to provide a saw holder or vise of the character mentioned that embodies a minimum number of simple, inexpensive parts. In the holder or vise of the present invention the clamp or vise proper comprises a single integral member and the levers, links, etc. of the vise actuating means and the saw advancing means are formed of simple, inexpensive plate stock or strap stock.

Another object of this invention is to provide a saw vise of the character referred to that is readily adjusted to handle saw blades, etc. of various widths and lengths and is well suited to hold band saws that have been arranged or looped to have a plurality of convolutions or loops that may be simultaneously gripped by the vise jaws so that their teeth may be simultaneously filed and that may be advanced in unison when the jaws are opened.

A further object of this invention is to provide improvements in saw vises or holders of the general type disclosed in my prior Patent No. 1,772,701, granted August 12, 1930.

The various objects and features of my invention will be fully understood from the following detailed description of a typical preferred form and application of the invention, throughout which description reference is made to the accompanying drawing, in which:

Fig. 1 is a front elevation of the improved holder or vise of the invention with a portion of a saw blade gripped thereby. Fig. 2 is an enlarged vertical detailed sectional view of the vise or holder taken as indicated by line 2—2 on Fig. 1. Fig. 3 is a fragmentary rear elevation of the device showing the saw advancing means in its actuated position in broken lines. Fig. 4 is an enlarged fragmentary horizontal sectional view taken as indicated by line 4—4 on Fig. 3. Fig. 5 is an enlarged fragmentary vertical sectional view taken as indicated by line 5—5 on Fig. 3, and Fig. 6 is an enlarged perspective view of the cam washer.

The improved saw holder or vise of the invention may be said to comprise, generally, a clamp or vise body 10, adjustable means 11 for supporting and locating a saw blade B in the body 10, means 12 for actuating the clamp or vise body 10 to grip the blade B, means 13 interconnected with the means 12 for advancing the blade B and adjustable ratchet means 14 for preventing a reverse movement of the blade B and for holding the blade in position for gripping by the vise body.

The clamp or vise body 10 is adapted to be secured to a support S such as a work bench, or the like. The body 10 is preferably, though not necessarily, an integral casting. In the preferred construction illustrated the body 10 comprises a base or shank 15 and spaced upstanding branches or jaws 16 extending upwardly from the shank 15. The body shank 15 may be fixed to the support S by bolts or screws 17. The jaws 16 are integrally joined with the upper end of the shank 15 and extend upwardly in spaced generally parallel relation. Ribs 18 may extend along the faces of the shank 15 and the jaws 16 at their margins to strengthen the body 10. The inner sides of the jaws 16 are preferably flat and plain. The upper ends of the jaws 16 are suitably rounded and the upper parts of the jaws are thickened at their inner sides to present opposing flat gripping faces 19. The faces 19 are substantially parallel and are finished to engage against the opposing sides of the saw blade B. In the preferred construction recesses 20 are provided in the lower sides of the thickened upper parts of the jaws 16. The jaws 16 are adapted to be flexed toward one another by the means 12 and are adapted to return to their normal open positions through their inherent resiliency. While the jaws 16 are adapted to grip saw blades of various kinds it will be assumed that the jaws are gripping three or more loops of the band saw blade B that has been flexed or shaped to have the several generally concentric loops. The portions of the blade B gripped by the jaws 16 are in side by side relation and are pressed one against the other by the jaws. It is to be observed that the clamp body or vise body 10 is a simple integral member requiring a minimum of machine work.

The means 11 is provided to guide and support the saw blade B so that the blade is received between the jaw faces 19 and has its teeth and upper edge portion exposed at the top of the vise or holder. The means 11 comprises what I will term a rest 21 arranged between the jaws 16 and projecting horizontally or laterally from the opposite sides of the jaws. The support or rest 21 preferably has a flat face engaging against the inner side of the front jaw 16 below the thickened upper part of the said jaw. The projecting end portions of the rest 21 extend upwardly and are thickened to form lugs 22 and 23 presenting upwardly facing surfaces 24 and 25, respectively. The surfaces 24 and 25 are flat and finished to be engaged by the lower edges of the loop portions of the blade B and serve to support and guide the loop portions of the blade. The lug 22 is of substantial length and is thickened to shiftably engage against the adjacent edge of the front jaw 16. The lug 23 is somewhat shorter than the lug 22 but is thickened to slidably engage against the adjacent edges of the two jaws 16. The engagement of the lugs 22 and 23 with the edges of the jaws 16 assists in guiding the shiftable rest 21 for vertical adjustment. It will be observed that the two spaced blade supporting surfaces 24 and 25 occur at the opposite ends of the pair of blade gripping faces 19 to effectively steady and support the blade B.

In accordance with the invention the means 11 is adjustable, that is, the rest 21 may be adjusted vertically to guide and support saw blades of various widths so that the blades will have their teeth in correct position for filing. The rest 21 is provided with a vertical slot 26 to receive a bolt 27. The bolt 27 may be in the nature of a carriage bolt, as illustrated, and may pass outwardly through an opening 28 in the front jaw 16. When arranged in this manner the bolt 27 has its head engage against the rear face of the rest 21 and has its square shank part received in the slot 26. A wing nut 29 is threaded on the projecting forward portion of the bolt 27 and is adapted to engage against the forward surface of the front jaw 16. When the nut 29 is loosened the lugs 22 and 23 may be engaged to move or adjust the rest 21 vertically to the selected position. The nut 29 may then be tightened down to set or secure the rest 21 in the selected position. The slot 26 is preferably of substantial length to provide for a considerable adjustment of the rest 21. A raised portion 30 may be provided on the upper end of the rest 21 to permit the upward elongation of the slot 26 and thus provide for a greater adjustment of the rest. The portion 30 is receivable in the above described recesses 20 in the jaws 16.

The means 12 for actuating the clamp jaws or vise jaws 16 is operable to flex the jaws inwardly to bring their faces 19 into secure gripping and holding engagement with the loop portions of the saw blade B and is adapted to free the jaws so that they may spread apart through their resiliency to assume their normal open positions. The means 12 is a manually operable means comprising a shaft or bolt 31 arranged through aligned horizontal openings 32 in the two jaws 16. The bolt 31 extends through the slot 26 and is preferably proportioned to engage with the side walls of the slot. With this arrangement the bolt 31 assists the bolt 27 in guiding the rest 21 for vertical movement. The bolt 31 is sufficiently long to project beyond the jaws 16 and is arranged with its head at its rear end and with its threaded portion at the front of the device. As illustrated, the bolt 31 is a carriage bolt having a polygonal or square shank 3 at the base of its head 32ª. A handle or operating lever 34 is secured to the projecting forward portion of the bolt 31 so that the bolt may be manually turned. The handle lever 34 has an opening receiving the bolt 31 and nuts 35 are threaded on the bolt 31 to clamp against the opposite sides of the lever. This, of course, secures the lever to the bolt 31. The handle 34 is keyed or set in a given position relative to the bolt 31 by key, polygonal or flat face engagement as at X.

The jaw operating means 12 further includes a cam mechanism for producing flexing and inward movement of the jaws 16 when the handle lever 34 is swung in one direction. A washer 36 is arranged on the bolt 31 and bears against a raised part or boss 37 on the rear jaw 16. The washer 36 has a square or polygonal opening 38 receiving a correspondingly shaped projection 39 on the rear jaw 16 so that it is positively held against turning. The washer 36 is shaped to have two diametrically opposite lifts or high parts 40 projecting from its rear side. The parts 40 are joined with the main face of the washer 36 by tapered or inclined surfaces 41. The cam means further includes a disc member 42 arranged on the bolt 31. The disc member 42 has a square hole cooperating with the square shank 33 to turn with the bolt. Openings 43 in the disc member 42 contain balls 44 which project from the front face of the member for cooperation with the washer 36. The balls 44 are adapted to engage or ride on the face of the washer 36 and upon turning of the bolt 31 may ride up the faces 41 to the flat surfaces of the parts 40. A lever 45 is arranged between the disc member 42 and the bolt head 32ª. The lever 45 has a square opening receiving the bolt shank 33 so that it turns with the bolt. The lever 45 closes the rear side of the openings 43 to prevent displacement of the balls 44 and to hold the balls in position for cooperation with the cam washer 36.

An overhang or apron 70 may be provided on the rear jaw to shed or divert the saw filings from the cam mechanism just described. The apron 70 may extend between the ribs 18 and lies in close overlying relation to the washer 36 and the disc member 42. The upper surface of the apron 70 slopes downwardly and outwardly to better divert the filings and the peripheral portion of the disc member 42 may be beveled or pitched for the same reason. A spring washer 46 is arranged between the front face of the front body 16 and the rear nut 36 to urge the bolt 31 forwardly. The washer 46 is a split flexible washer and may be termed a lock washer. The function of the washer 46 will be later described.

The parts are proportioned and related so that the jaws 16 are in their normal open positions when the balls 44 engage on the main or plain surfaces of the washer 36. When the bolt 31 is turned by swinging of the handle lever 34 the balls 44 ride up the surfaces 41 into the raised parts 40 of the washer 36. This action causes inward flexing of the jaws 16 so that the faces 19 tightly grip the blade B or the looped blade portions. The parts 40 have flat vertical surfaces of substantial width and the balls 44 remain in cooperation with these flat surfaces until the lever 34 is again moved. The washer 46 is capable of substantial compression when the jaws are in active holding engagement with the upper blade B. The washer 46 is preferably quite stiff so that the jaws 16 are first flexed to grip the blade B or the blade portions and then the washer 46 is flexed or compressed to allow for the full stroke of the handle 34. This allows the balls 44 to ride onto the flat raised surfaces of the parts 40 after the blade has been gripped by the two faces 19 and gives the holder a greater range of usefulness adapting it to hold saws and saw blades varying greatly in thickness.

The blade advancing means 13 is operable to shift the saw blade B a distance substantially equal to the length of the jaw surfaces 19 immediately following the opening the jaws 16 and with the same motion or an extended motion of the operating lever 34. The blade advancing means 13 includes a lever 47 arranged behind the rear jaw 16 and pivotally supported at its lower end by a pin or screw 48 on said jaw. The lever 47 is of sufficient length to extend upwardly beyond the upper ends of the jaws 16. A pawl or blade advancing dog 49 is pivotally connected with the upper end of the lever 47 by a pin 50 and hangs or depends by gravity to cooperate with the teeth of the blade B, or the teeth of the loop portions of the blade.

The lever 47 is operatively connected with the jaw operating means 12 in such a manner that the dog 49 is operated into cooperation with the teeth of the blade B immediately following the opening of the jaws 16 and by the same movement of the lever 34 that effects opening of the jaws. A link 52 is connected with the lever 45 by a pivot pin 53 and is connected with the lever 47 by a similar pin 54. It will be seen that the lever 45 and the link 52 form a toggle connection or a link connection between the bolt 31 and the lever 47. The lever 45 is preferably extended beyond the pivot pin 53 to have an outer edge 55 cooperable with the edge of the lever 47 to limit its pivoting. The engagement of the lever end 55 with the lever 47 of course limits swinging of the operating lever 34 in one direction and preferably prevents the axes of the bolt 31, the pin 53 and the pin 54 from reaching a "dead center" position where they are aligned.

When the lever end 55 is in engagement with or adjacent the lever 47 the jaws 16 are closed or in holding engagement with the blade B or looped blade portions, and the dog 47 is in its retracted idle position. This position is illustrated in Fig. 1 of the drawing. When the operating lever 34 is swung upwardly from the position illustrated in Fig. 1 of the drawing the balls 44 leave the cam parts 40 and ride onto the plain faces of the cam washer 36 so that the jaws 16 flex to their open positions. As the balls 44 move down the inclined faces 41 the dog 49 moves to the position where its blade 51 comes into cooperation with the teeth of the saw blade B. Further movement of the handle lever 34 merely moves the balls 44 across the plain face of the washer 36 and does not affect the jaws 16 but does move the dog 49 so that the dog advances the blade B between the open jaws 16. On the return stroke of the handle lever 34 the dog 49 moves back to its retracted position clear of the saw teeth before the balls 44 ride up the surfaces 41 to cause contraction of the jaws 16.

The means 14 operates to hold the blade B against reverse movement during the return stroke of the dog 49, serves to prevent the looped blade from springing from between the jaws 16 when the latter are opened, serves to assist in aligning the teeth of the looped blade portions received between the jaws 16, and operates to support the saw advancing dog in its normal retracted position. The means 14 includes a post 57 adjustable vertically on the lug 22 of the rest 11. The post 57 is an inverted L-shaped element formed of plate stock or strap stock. The long vertical leg of the post 57 is slidable in a groove 58 provided in the rear side of the lug 22 and the post is arranged so that its short leg 59 projects forwardly. A slot 60 is provided in the long leg of the post 57 and receives a bolt 61 which passes forwardly through an opening in the lug 22. A wing nut 62 is threaded on the projecting forward end of the bolt 61 and is engageable against the front of the lug 22 to lock the post 57 in any selected position.

The upper leg 59 of the post 57 slopes downwardly and inwardly toward the jaws 16 and carries a ratchet element in the form of a leaf spring 63. The leaf spring 63 may be riveted to the leg 59. The leaf spring 63 slopes downwardly and inwardly toward the jaws 16 and is arranged so that the dog 49 may move up and down on it when the means 13 is operated. The lower edge of the leaf spring 63 is shaped and arranged to have ratchet engagement with the teeth of the loop portions of the blade B. As illustrated in Figs. 1 and 3 the blade B is arranged so that its teeth oppose or face toward the spring 63 and the engagement of the spring with the saw teeth effectively prevents a reverse movement of the saw blade during the restoration of the blade advancing dog 49, and effectively holds the blade or blade portions against upward movement.

In operation the band saw blade B is looped, as described above, and is arranged with three or more loop portions between the jaws 16. The rest 21 is adjusted vertically and secured in position by tightening of the wing nut 29 and the post 57 is adjusted and secured in place by the wing nut 62. The rest 21 and the post 57 may be readily adjusted to support the saw blade B in the correct position and to assure the proper engagement of the ratchet spring 63 with the saw teeth. Following the adjusting of the rest 21 and the post 57 the operating lever 34 is lowered or swung to the position illustrated in Fig. 1 of the drawing. This operation of the lever 34 of course turns the bolt 31 and causes the balls 44 to move across the plain surfaces of the washers 36 and then ride up the surfaces 41 to the flat faces of the parts 40. The cooperation of the balls 44 with the surfaces 41 results in inward flexing of the jaws 16 so that the jaw faces 19 tightly hold or grip the blade B. The above described operation of the handle lever 34 brings the dog 49 to the retracted position clear of the saw blade B. The dog 49 moves clear of the saw blade B before the balls 44 reach the flat top surfaces of the cam parts 40. The engagement of the balls 44 with the flat surfaces of the cam parts 40 holds the parts in the condition where the blade B is securely gripped by the jaws 16. The teeth of that portion of the saw blade B firmly held by the jaws 16 are then filed.

Following this filing operation the handle lever 34 is swung upwardly to open the jaws 16. This operation of the lever 34 causes the balls 44 to move down the surfaces 41 to the plain flat surfaces of the washer 36 and as the balls 44 move down the surfaces 41 the jaws 16 flex apart to free the blade B. Operation of the lever 34 also causes swinging of the lever 47 and movement of the dog 49. The blade 51 of the dog 49 rides down the spring 63 and comes into engagement with the teeth of the saw blade B immediately following the opening of the jaws 16. When the blade 51 comes into engagement with the teeth of the blade B it automatically aligns the teeth of the three or more loops of the blade. The spring 63 engaging the teeth tends to restrain or hold back any loop or loop portion that may be in advance of the others so that the movement imparted to the blade loops by the pawl or blade 51 brings the teeth of the several loops or loop portions into correct registration. The remainder of the stroke or movement of the handle lever 34 pivots the lever 47 and moves the dog 49 so that its blade 51 cooperating with the saw teeth advances the blade B or the several loops of the blade. The blade B is advanced a distance substantially equal to the length of the jaw faces 19 and the portions of the blade that have been sharpened or filed are advanced from the jaws and unsharpened portions of equal length are brought to position between the jaws. The lever 34 is then swung down to the position illustrated in Fig. 1 to reset the jaws 16 and to return the dog 49. During the restoration of the dog 49 the leaf spring 63 cooperating with the teeth of the blade B prevents the blade or blade portions from moving in a reverse direction and holds the blade portions down in place. The teeth of the several blade portions are automatically brought into register as the loop or blade portions are advanced and when the jaws 16 have been closed the aligned teeth of the several blade portions may be simultaneously filed.

The saw holder or vise of the present invention embodies a minimum number of simple inexpensive parts. The operating lever 34, the lever 45, the lever 47, the link 52, and the dog 49 may all be formed of identical plate stock or strap stock and are all simple parts. The body 10 may be a simple one-piece casting and does not embody any moving parts. The device is adjustable so that it is capable of handling band saw blades, and the like, of practically any width.

Having described only a typical preferred form and application of my invention, I do not wish to be limited or restricted to the specific details herein set forth, but wish to reserve to myself any variations or modifications that may appear to those skilled in the art, or fall within the scope of the following claims.

Having described my invention, I claim:

1. A saw holder comprising a pair of normally open jaws operable when closed to grip a saw blade, a rest for shiftably supporting the blade, means supporting the rest on the jaws for adjustment whereby the rest may support the saw blade between the jaws with its toothed edge above the jaws, means for moving the jaws together to hold the blade, a shiftable member engageable with the teeth of the blade to advance the blade when the jaws are open, a single means for successively operating the jaw closing means and the said member, a spring blade for cooperating with the teeth of the blade, and means adjustably supporting the spring blade on the rest to slope downwardly and forwardly relative to the direction of advancement of the blade so that its lower edge cooperates with the rear edges of the teeth to prevent retrograde movement of the blade.

2. A saw holder comprising a shank, jaws extending from the shank in spaced relation and having aligned transverse openings, a turnable bolt extending through said openings, a handle fixed on one end portion of the bolt, a member keyed to the other end part of the bolt, a cam on one jaw having a rise, a ball on the member cooperating with the cam and movable onto the rise to flex the jaws into holding engagement with the saw blade when the handle is turned in one direction and movable off the rise to allow the jaws to open when the handle is turned in the other direction, and means for advancing the blade when the handle is turned in said other direction.

3. A device of the character described comprising jaws normally spaced apart and operable toward one another to grip a saw blade, a rest mounted between the jaws and having a portion extending therefrom for supporting the blade, means for actuating the jaws toward one another to grip the blade and operable to release the jaws for return to their normal condition, means for advancing the blade, means for actuating the first named means and for operating the saw advancing means immediately following the restoration of the jaws to their open positions, a spring blade, and means for supporting the blade on said portion of the rest for vertical adjustment and to slope downwardly and forwardly relative to the direction of advancement of the blade so that its lower edge is engageable with the teeth of the saw blade to hold the blade down against the rest and to positively prevent retrograde movement of the blade.

CLAUDE E. BROWN.